US008883044B2

(12) United States Patent
Kim et al.

(10) Patent No.: US 8,883,044 B2
(45) Date of Patent: Nov. 11, 2014

(54) MULTI-FUNCTIONAL RESIN COMPOSITE MATERIAL AND MOLDED PRODUCT USING THE SAME

(75) Inventors: Sung-Jun Kim, Uiwang-si (KR); Young-Sik Ryu, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 111 days.

(21) Appl. No.: 13/530,144

(22) Filed: Jun. 22, 2012

(65) Prior Publication Data

US 2012/0319055 A1 Dec. 20, 2012

Related U.S. Application Data

(63) Continuation-in-part of application No. PCT/KR2010/008598, filed on Dec. 2, 2010.

(30) Foreign Application Priority Data

Dec. 23, 2009 (KR) .................. 10-2009-0130067

(51) Int. Cl.
*H01B 1/04* (2006.01)
*C08J 5/10* (2006.01)
*C08J 5/06* (2006.01)

(52) U.S. Cl.
CPC ..... *C08J 5/10* (2013.01); *C08J 5/06* (2013.01)
USPC .......................................... 252/503; 252/512

(58) Field of Classification Search
CPC ..... Y02E 10/50; H01L 27/1423; H01J 11/18; B32B 15/08; C08L 2666/02
USPC .......................................... 252/503, 511, 513
See application file for complete search history.

(56) References Cited

U.S. PATENT DOCUMENTS

| | | | |
|---|---|---|---|
| 4,566,990 A * | 1/1986 | Liu et al. ............. | 252/503 |
| 4,596,670 A | 6/1986 | Liu | |
| 4,952,448 A * | 8/1990 | Bullock et al. ........ | 428/323 |
| 5,366,664 A * | 11/1994 | Varadan et al. ....... | 252/512 |
| 5,869,412 A | 2/1999 | Yenni, Jr. et al. | |
| 6,225,565 B1 * | 5/2001 | Prysner ............ | 174/120 SC |
| 6,384,507 B1 | 5/2002 | Lee et al. | |
| 6,409,942 B1 | 6/2002 | Narkis et al. | |
| 6,638,448 B2 | 10/2003 | Karttunen et al. | |
| 7,335,838 B2 | 2/2008 | Simola | |
| 7,935,415 B1 * | 5/2011 | Hansen et al. ........ | 428/292.1 |
| 2002/0108699 A1 | 8/2002 | Cofer et al. | |
| 2005/0162249 A1 | 7/2005 | Simola | |
| 2007/0056769 A1 | 3/2007 | Severance et al. | |
| 2007/0199738 A1 | 8/2007 | Gabower | |
| 2008/0248230 A1 | 10/2008 | Dewitte et al. | |
| 2010/0311866 A1 * | 12/2010 | Huang et al. ......... | 523/137 |
| 2011/0204298 A1 | 8/2011 | Chang et al. | |
| 2013/0309474 A1 * | 11/2013 | Peek et al. .......... | 428/220 |

FOREIGN PATENT DOCUMENTS

| | | |
|---|---|---|
| JP | 54-076426 A | 6/1979 |
| JP | 2002-538581 A | 11/2002 |
| JP | 2003-272453 A | 9/2003 |
| JP | 2003-306553 A | 10/2003 |
| JP | 2005-514797 A | 5/2005 |
| KR | 10-1999-0020144 A | 3/1999 |
| KR | 10-2001-0036472 A | 5/2001 |
| KR | 10-2001-0046091 A | 6/2001 |
| KR | 10-2002-0005607 A | 1/2002 |
| KR | 10-2004-0029085 A | 4/2004 |
| KR | 10-2005-0050720 A | 6/2005 |
| KR | 10-2008-0011686 A | 2/2008 |
| KR | 10-0856137 B1 | 8/2008 |
| WO | 00/51143 A1 | 12/2001 |
| WO | 2011/078492 A2 | 6/2011 |

OTHER PUBLICATIONS

Toho Tenax Properties of Metal-Coated Fiber.*
International Search Report in counterpart International Application No. PCT/KR2010/008598 dated Aug. 24, 2011, pp. 1-8.

* cited by examiner

*Primary Examiner* — Mark Kopec
*Assistant Examiner* — William Young
(74) *Attorney, Agent, or Firm* — Additon, Higgins & Pendleton, P.A.

(57) ABSTRACT

Disclosed are a multi-functional resin composite material including (A) a thermoplastic resin, (B) a nickel-coated carbon fiber, (C) a carbon nanotube, and (D) an inorganic material having a volume resistance of about $10^{-3}$ Ω·m or less and a relative permeability of about 5000 or more, and a molded product fabricated using the same.

13 Claims, No Drawings

MULTI-FUNCTIONAL RESIN COMPOSITE MATERIAL AND MOLDED PRODUCT USING THE SAME

CROSS-REFERENCE TO RELATED APPLICATIONS

This application is a continuation-in-part of International Application No. PCT/KR2010/008598, filed Dec. 2, 2010, pending, which designates the U.S., published as WO 2011/078492, and is incorporated herein by reference in its entirety, and claims priority therefrom under 35 USC Section 120. This application also claims priority under 35 USC Section 119 from Korean Patent Application No. 10-2009-0130067, filed Dec. 23, 2009, in the Korean Intellectual Property Office, the entire disclosure of which is also incorporated herein by reference.

FIELD

This disclosure relates to a multi-functional resin composite material and a molded product using the same.

BACKGROUND

As electric/electronic products become smaller, more highly integrated, and lighter, interior parts thereof need to be fabricated into a module. For example, an interior frame requiring ground-connection capability should have electrical conductivity and high mechanical strength, while an exterior material requiring EMI/RFI shielding properties should provide EMI/RFI shielding and have a desirable appearance.

Conventionally, these functions have been realized by combining materials having each characteristic. There is an increasing need, however, for a multi-functional material having high strength, electromagnetic wave shielding characteristic, and the like to satisfy the requirements for downsized, highly integrated, and lighter electric/electronic products.

A conventional method of shielding electromagnetic waves includes coating/plating a metal material. The metal material has high conductivity (R, low impedance) and thus, a high electromagnetic wave shielding ratio by reflecting an electromagnetic wave on the surface. Accordingly, even a thin metal coating may effectively shield an electromagnetic wave. However, the coating/plating is a complex process and may deteriorate productivity.

U.S. Patent Publication No. 2007-0199738 discloses a electromagnetic wave shielding device including a polymer substrate coated with metal on its surface. U.S. Patent Publication No. 2007-0056769 discloses an electromagnetic wave shield material including a non-conductive polymer, a conductive polymer, and an electrical conductive metal powder. U.S. Publication No. 2002-0108699 discloses a method of manufacturing an electrically conductive impregnated fiber by coating a conductive fiber with a compatibilizer such as an organic wetting agent, and compositing the same in a resin. U.S. Pat. No. 6,638,448 discloses an electrically conductive thermoplastic elastomer including a conductive filler of nickel plated with silver in a styrene-ethylene-butadiene-styrene copolymer (SEBS) based matrix material which is a non-conductive resin. U.S. Pat. No. 6,409,942 discloses an electrically conductive composition in which a carbonaceous conductive filler is immersed in a blend of two polymer resins having different polarities and the carbonaceous conductive filler is disposed on one having the higher polarity. U.S. Pat. No. 5,869,412 discloses a thermoplastic electromagnetic wave shielding sheet including a sheet material or polymer carrier that is capable of forming pores during a thermoplastic process and including a low-melting point metal conductive filler. However, these technologies may not provide all of the various properties increasingly required for electric and electronic products, such as high strength, high electrical conductivity, and EMI/RFI shielding properties.

SUMMARY

One embodiment provides a multi-functional resin composite material that can have excellent hardness, electrical conductivity, and EMI/RFI shielding properties.

Another embodiment provides a molded product produced using the multi-functional resin composite material.

According to one embodiment, provided is a multi-functional resin composite material that includes (A) a thermoplastic resin; (B) a nickel-coated carbon fiber; (C) a carbon nanotube; and (D) an inorganic material having a volume resistance of about $10^{-3}$ Ω·m or less and a relative permeability of about 5000 or more.

The multi-functional resin composite material may include about 40 wt % to about 80 wt % of the thermoplastic resin (A), about 10 wt % to about 40 wt % of the nickel-coated carbon fiber (B), about 0.1 wt % to about 2 wt % of the carbon nanotube (C), and about 3 wt % to about 20 wt % of the inorganic material (D), wherein each of the foregoing amounts is based on the total weight of the multi-functional resin composite material.

The thermoplastic resin (A) may include a polyamide resin, a polyester resin, a polyacetal resin, a polycarbonate resin, a polyimide resin, a polyphenyleneoxide resin, a polysulfone resin, a polyphenylenesulfide resin, a polyamideimide resin, a polyethersulfone resin, a liquid crystal polymer, a polyetherketone resin, a polyetherimide resin, a polyolefin resin, a rubber modified vinyl-based copolymer resin, a polystyrene-based resin, or a combination thereof, and may be also a crystalline resin.

The nickel-coated carbon fiber (B) may include a carbon fiber having a diameter of about 5 μm to about 12 μm and a length of about 3 μm to about 12 mm. The nickel-coated carbon fiber (B) may include a nickel coating on a carbon fiber having a thickness of about 0.1 μm to about 1 μm. The nickel-coated carbon fiber (B) may have a volume resistance of about $10^{-4}$ Ω·m or less and a tensile strength of about 200 GPa or more.

The carbon nanotube (C) may have a diameter of about 1 nm to about 50 nm and a length of about 10 nm to about 20 μm.

The inorganic material (D) may include a nickel-iron alloy, such as but not limited to a Mu-metal, a Perm alloy, or a combination thereof.

The multi-functional resin composite material may further include about 5 parts by weight to about 20 parts by weight of (E) glass fiber based on about 100 parts by weight of the multi-functional resin composite material. The glass fiber (E) may have a diameter of about 8 μm to about 15 μm and a length of about 2 mm to about 12 mm.

The multi-functional resin composite material may further include one or more additives, such as but not limited to an antibacterial agent, a heat stabilizer, an antioxidant, a release agent, a light stabilizer, a surfactant, a coupling agent, a plasticizer, an admixture, a stabilizer, a lubricant, an antistatic agent, a colorant aid, a flame proofing agent, a weather-resistance agent, a colorant, an ultraviolet (UV) absorber, an ultraviolet (UV) blocking agent, a nucleating agent, an adhesion aid, an adhesive, or a combination thereof.

Another embodiment provides a molded product manufactured using the multi-functional resin composite material.

Hereinafter, further aspects of the present invention will be described in detail.

A multi-functional resin composite material according to one embodiment can have various different properties such as excellent hardness, electrical conductivity, and EMI/RFI shielding properties. Thus, the multi-functional resin composite material may be used as a material for various electronic parts, which tend to be down-sized, highly integrated, and mass-produced.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

EMI shielding effectiveness may be represented by the following Equation 1.

$$S.B. \text{ (shielding effectiveness)} = R + A + B \quad \text{[Equation 1]}$$

In Equation 1, R represents surface reflection of an electromagnetic wave (electrical conductivity), A represents internal absorption of an electromagnetic wave, and B represents loss due to multi-reflection.

Since a resin composite material has lower electrical conductivity than a metal material, the internal absorption as well as the surface reflection shown in Equation 1 needs to be improved. Accordingly, a resin composite material may have high electromagnetic wave shielding efficiency by lowering surface impedance, that is, increasing electrical conductivity to increase R and thus, increasing A corresponding to internal absorption of an electromagnetic wave in order to increase electromagnetic wave shield efficiency.

In order words, a resin composite material may efficiently shield an electromagnetic wave by improving electrical conductivity and increasing internal absorption of the electromagnetic wave. As used herein, the internal absorption of an electromagnetic wave relates to permeability of a material, and a material with high permeability may provide a resin composite material with highly efficient electromagnetic wave shielding properties.

However, a material having only high permeability, for example, a non-conductive material such as sendust, ferrite, and the like may bring about a little electromagnetic wave interference (EMI)/radio frequency interference (RFI) shielding effects of a resin composite material.

Accordingly, one embodiment provides a resin composite material having improved EMI/RFI shielding efficiency by using a particular inorganic material having both of high electrical conductivity and high permeability. The resin composite material may have excellent hardness and electrical conductivity as well as excellent EMI/RFI shielding property by using a carbon fiber coated with nickel thereon and a carbon nanotube, simultaneously, as well an inorganic material.

According to one embodiment, a multi-functional resin composite material includes (A) a thermoplastic resin, (B) a nickel-coated carbon fiber, (C) a carbon nanotube, and (D) an inorganic material having a volume resistance of about $10^{-3}$ Ω·m or less and a relative permeability of about 5000 or more.

Each component included in the multi-functional resin composite material will hereinafter be described in detail.

(A) Thermoplastic Resin

Examples of the thermoplastic resin may include without limitation polyamide resins, polyester resins, polyacetal resins, polycarbonate resins, polyimide resins, polyphenyleneoxide resins, polysulfone resins, polyphenylenesulfide resins, polyamide-imide resins, polyethersulfone resins, liquid crystal polymers, polyetherketone resins, polyetherimide resins, polyolefin resins, rubber modified vinyl-based copolymer resins, polystyrene-based resins, and the like, and combinations thereof.

In exemplary embodiments, the thermoplastic resin may be a crystalline resin. Examples of the crystalline resin may include without limitation polyamide resins, polyester resins, polyacetal resins, polyphenylene sulfide resins, liquid crystal polymers, polyetherketone resins, polyolefin resins, polystyrene-based resins, and the like, and combinations thereof. In exemplary embodiments, the thermoplastic crystalline resin may be polyphenylenesulfide resin.

The crystalline resin has a characteristic of repelling fillers, such as the nickel-coated carbon fiber, carbon nanotube, and inorganic material according to one embodiment, out of a crystallization region during crystallization and can easily form a conductive path by providing a network among the fillers. As result, a crystalline resin can have better conductivity than a non-crystalline resin. In addition, since the fillers reinforce the crystalline resin, the crystalline resin can have better hardness than a non-crystalline resin.

The polyamide resin includes an amide group in the polymer main chain and may be polymerized using amino acid, lactam or diamine, and dicarboxylic acid as a main component.

Examples of the polyamide resin may include without limitation polycaprolactam (polyamide 6), poly(11-aminoundecanoic acid) (polyamide 11), polylauryllactam (polyamide 12), polyhexamethylene adipamide (polyamide 66), polyhexaethylene azelamide (polyamide 69), polyhexaethylene sebacamide (polyamide 610), polyhexaethylene dodecanodiamide (polyamide 612), and the like, copolymers thereof such as polyamide 6/610, polyamide 6/66, polyamide 6/12, and the like. These may be used singularly or a mixture of two or more at an appropriate ratio.

The polyester resin is an aromatic polyester resin, which is condensed and polymerized through melt-polymerization of terephthalic acid or terephthalic acid alkyl ester and a C2 to C10 glycol component. As used herein with reference to the terephthalic acid alkyl ester, the alkyl can be a C1 to C10 alkyl.

Examples of the aromatic polyester resin may include without limitation polyethylene terephthalate resins, polytrimethylene terephthalate resins, polybutylene terephthalate resins, polyhexamethylene terephthalate resins, polycyclohexane dimethylene terephthalate resins, resins prepared by partly mixing other monomers with these resins to modify the monomers to provide a non-crystalline resin, and the like, and combinations thereof. In exemplary embodiments, the polyester resin can be a polyethylene terephthalate resin, a polytrimethylene terephthalate resin, a polybutylene terephthalate resin, a non-crystalline polyethylene terephthalate resin, and the like.

The polyacetal resin is a crystalline polymer, which is a polymer of formaldehyde having an acetal bond in the main chain, or a polymer of trioxane having an acetal bond in the main chain. The polyacetal resin can have excellent electric insulation, abrasion resistance, heat resistance, and the like.

The polyphenylene sulfide resin can include about 70 mol % or more of a repeating unit represented by the following Chemical Formula 1. When the repeating unit is included in an amount of about 70 mol % or more, the polyphenylene sulfide resin can have high crystallinity and excellent heat resistance, chemical resistance, and hardness.

[Chemical Formula 1]

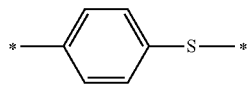

The polyphenylene sulfide resin may include a repeating unit represented by at least one selected from Chemical Formulas 2 to 9 in addition to a repeating unit represented by the above Chemical Formula 1.

[Chemical Formula 2]

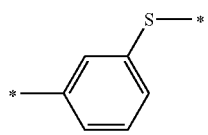

[Chemical Formula 3]

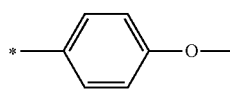

[Chemical Formula 4]

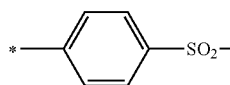

[Chemical Formula 5]

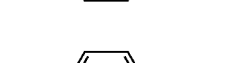

[Chemical Formula 6]

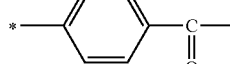

[Chemical Formula 7]

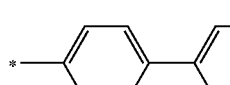

In the above Chemical Formula 7,
R is C1 to C20 alkylene, C6 to C30 arylene, C1 to C20 alkoxylene, or a combination thereof.

[Chemical Formula 8]

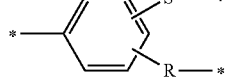

[Chemical Formula 9]

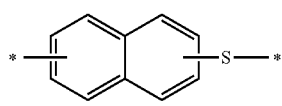

The repeating unit represented by at least one selected by the above Chemical Formulas 2 to 9 may be included in an amount of less than about 50 mol %, for example in an amount of less than about 30 mol %, relative to the repeating unit represented by the above Chemical Formula 1. When the repeating unit represented by at least one selected from the above Chemical Formulas 2 to 9 is included in an amount of less than about 50 mol %, the polyphenylene sulfide resin can have excellent heat resistance and mechanical properties.

The liquid crystal polymer is a polymer having liquid crystal property in a solution or in a dissolved state, which can have good heat resistance and strength, and may be processed through micro-machining.

The polyetherketone resin can have excellent heat resistance, flame retardancy, hot water resistance, chemical resistance, and the like.

Examples of the polyolefin resin may include without limitation high density polyethylene (HDPE) resins, linear low density polyethylene (LLDPE) resins, polypropylene resins, polybutylene resins, ethylene-propylene copolymer resins, ethylene-vinyl alcohol copolymer resins, and the like, and combinations thereof. In exemplary embodiments, polypropylene resin may be used. As used herein, the high density polyethylene resin may have a density range ranging from about 0.94 to about 0.965, while the linear low density polyethylene resin may have a density range ranging from about 0.91 to about 0.94.

Examples of the polystyrene-based resin may include without limitation polystyrene resins, syndiotactic polystyrene resins, and the like, and combinations thereof. Syndiotactic polystyrene resin having high tacticity may be prepared using a styrene monomer using a catalyst system including a methallocene catalyst and a cocatalyst.

The multi-functional resin composite material may include the thermoplastic resin in an amount of about 40 wt % to about 80 wt %, for example about 60 wt % to about 75 wt %, based on total amount (weight) of the multi-functional resin composite material. In some embodiments, the multi-functional resin composite material may include the thermoplastic resin in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the thermoplastic resin can be in a range from about any of the foregoing amounts to about any other of the foregoing amounts.

When thermoplastic resin is included in an amount within the above range, the resin composite material may exhibit good workability, and excellent hardness, electrical conductivity, and EMI/RFI shielding properties.

(B) Nickel-Coated Carbon Fiber

The nickel-coated carbon fiber includes a carbon fiber and nickel coating thereon to provide an EMI/RFI shielding effect. The nickel-coated carbon fiber can form a network structure with an inorganic material having high transmittance. This in turn can provide excellent shielding effects.

The carbon fiber may be a pan-based or pitch-based carbon fiber.

The carbon fiber may have a diameter of about 5 μm to about 12 μm, for example about 7 μm to about 10 μm. The carbon fiber may have a length of about 3 mm to about 12 mm, for example about 3 mm to about 8 mm. When the carbon fiber has a diameter and a length within the respective ranges, the carbon fiber may easily form a conductive path and simultaneously secure excellent workability.

The nickel may be coated using a common or conventional metal-coating method such as electroless plating or electrolytic plating.

The nickel-coated carbon fiber may include a nickel coating with a thickness of about 0.01 μm to about 1 μm on the carbon fiber, for example about 0.1 μm to about 0.5 μm thick. When the nickel is coated to a thickness within the above thickness range, the nickel coating layer may have sufficient coating effects, excellent hardness, and excellent efficient production process.

The nickel-coated carbon fiber may have a volume resistance ranging from about $10^{-4}$ Ω·m or less, for example about $10^{-6}$ Ω·m or less, and a tensile strength of about 150 GPa or more, for example about 200 GPa or more. The nickel-coated carbon fiber having a volume resistance and tensile strength within the above ranges may provide excellent electrical conductivity and mechanical strength.

The multi-functional resin composite material may include the nickel-coated carbon fiber in an amount of about 10 wt % to about 40 wt %, for example about 15 wt % to about 25 wt %, based on total weight of the multi-functional resin composite material. In some embodiments, the multi-functional resin composite material may include the nickel-coated carbon fiber in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the nickel-coated carbon fiber can be in a range from about any of the foregoing amounts to about any other of the foregoing amounts.

When the nickel-coated carbon fiber is included in an amount within the above range, the resin composite material may exhibit excellent hardness, electrical conductivity, and EMI/RFI shielding properties.

(C) Carbon Nanotube

The carbon nanotube has mechanical properties such as high mechanical strength, high Young's Modulus, and high aspect ratio, high electrical conductivity, and high thermal stability.

Methods of synthesizing the carbon nanotubes include without limitation arc-discharge, pyrolysis, plasma chemical vapor deposition (PECVD), thermal chemical vapor deposition (CVD), electrolysis, and the like. The carbon nanotubes may be used regardless of method used to make the same.

The carbon nanotubes may be classified as single-walled carbon nanotubes, double-walled carbon nanotubes, and multi-walled carbon nanotubes, depending on the number of walls. In exemplary embodiments, multi-walled carbon nanotubes may be used.

The carbon nanotubes may have a diameter of about 1 nm to about 50 nm, and a length of about 10 nm to about 20 μm. When the carbon nanotubes have a diameter and length within the above range, electrical conductivity and workability of the resin composite material may be improved.

The carbon nanotubes may have a purity of about 80% or more and an aspect ratio ranging from about 100 to about 1,000. When the carbon nanotubes have a purity and aspect ratio within the above ranges, electrical conductivity may be further improved.

The multi-functional resin composite material may include the carbon nanotubes in an amount of about 0.1 wt % to about 2 wt %, for example about 0.3 wt % to about 1 wt %, based on total amount (weight) of the multi-functional resin composite material. In some embodiments, the multi-functional resin composite material may include the carbon nanotubes in an amount of about 0.1, 0.2, 0.3, 0.4, 0.5, 0.6, 0.7, 0.8, 0.9, 1, or 2 wt %. Further, according to some embodiments of the present invention, the amount of the carbon nanotubes can be in a range from about any of the foregoing amounts to about any other of the foregoing amounts.

When the carbon nanotubes are included in an amount within the above range, the resin composite material may exhibit excellent hardness, electrical conductivity, and EMI/RFI shielding properties.

(D) Inorganic Material

The inorganic material may have high electrical conductivity and high permeability.

Examples of the inorganic material may include without limitation nickel-iron alloys which can have a high magnetic permeability, such as but not limited to Mu-metals, Permalloys, and the like, and combinations thereof. The nickel-iron alloy can include nickel in an amount ranging from about 45 to about 80wt %, and can also include other metals such as molybdenum, chromium, and/or copper.

The inorganic material may have a volume resistance of about $10^{-1}$ Ω·m or less, for example about $10^{-3}$ Ω·m or less, and a relative permeability of about 1000 or more, for example about 5000 or more. When an inorganic material having a volume resistance and relative permeability within the above range is used, the resin composite material may exhibit excellent electrical conductivity and EMI/RFI shielding properties.

The multi-functional resin composite material may include the inorganic material in an amount of about 3 wt % to about 20 wt %, for example about 5 wt % to about 15 wt %, based on total amount (weight) of the multi-functional resin composite material. In some embodiments, the multi-functional resin composite material may include the inorganic material in an amount of about 3, 4, 5, 6, 7, 8, 9, 10, 11, 12, 13, 14, 15, 16, 17, 18, 19, or 20 wt %. Further, according to some embodiments of the present invention, the amount of the inorganic material can be in a range from about any of the foregoing amounts to about any other of the foregoing amounts.

When the inorganic material is included within in an amount the above range, the resin composite material may have excellent electrical conductivity and EMI/RFI shielding properties.

(E) Glass Fiber

The multi-functional resin composite material according to one embodiment may further include a glass fiber in order to improve hardness of the resin composite material.

The glass fiber is commercially available and may be a glass fiber having a diameter ranging from about 8 μm to about 15 μm and a length ranging from about 2 mm to about 12 mm. The glass fiber having a diameter and a length within the ranges may provide a resin composite material having excellent hardness.

The cross-section shape of the glass fiber is not limited, and the glass fiber may have a cross-section such as a circle, an oval, a rectangle, or a dumbbell shapes in which two circles are connected each other.

The glass fiber may be coated with a predetermined glass fiber-treating agent on the surface to improve impregnation of a thermoplastic resin. The glass fiber-treating agent may include a lubricant, a coupling agent, a surfactant, a compatibilizer, and the like. The lubricant is used to form a good strand having a predetermined diameter and thickness during the fabrication of the glass fiber, the coupling agent is used to promote adhesion of a thermoplastic resin to the glass fiber, and the compatibilizer may be a silane-based compatibilizer.

The multi-functional resin composite material may include the glass fiber in an amount of about 5 parts by weight to about 20 parts by weight, for example about 5 parts by weight to about 10 parts by weight, based on about 100 parts by weight of the multi-functional resin composite material. In some embodiments, the multi-functional resin composite material may include the glass fiber in an amount of about 5, 6, 7, 8, 9, 10, 11, 12, 13, 14, 15, 16, 17, 18, 19, or 20 parts by weight. Further, according to some embodiments of the present invention, the amount of the glass fiber can be in a range from about any of the foregoing amounts to about any other of the foregoing amounts.

When the glass fiber is included in an amount within the above range, the resin composite material may exhibit excellent hardness, electrical conductivity, and EMI/RFI shielding properties.

(F) Other Additive(s)

The multi-functional resin composite material may further include one or more additives. Examples of the additives include without limitation antibacterial agents, heat stabilizers, antioxidants, release agents, light stabilizers, surfactants, coupling agents, plasticizers, admixtures, stabilizers, lubricants, antistatic agents, colorant aids, flameproofing agents, weather-resistance agents, colorants, ultraviolet (UV) absorbers, ultraviolet (UV) blocking agents, nucleating agents, adhesion aids, adhesives, and the like, and combinations thereof, depending on its application.

Examples of the antioxidant may include without limitation phenol-type antioxidants, phosphate-type antioxidants, thioether-type antioxidants, amine-type antioxidants, and the like, and combinations thereof. Examples of the release agent may include without limitation fluorine-included polymers, silicone oils, metal salts of stearylic acid, metal salts of montanic acid, montanic acid ester waxes, polyethylene waxes, and the like, and combinations thereof. Examples of the weather-resistance agent may include without limitation benzophenone weather-resistance agents, amine weather-resistance agents, and the like, and combinations thereof. Examples of the colorant may include without limitation dyes, pigments, and the like, and combinations thereof. Examples of the ultraviolet (UV) blocking agent may include without limitation titanium oxide ($TiO_2$), carbon black, and the like, and combinations thereof. Examples of the nucleating agent may include without limitation talc, clay, and the like, and combinations thereof.

The multi-functional resin composite material may include the additive in an amount of about 0.1 to about 30 parts by weight, based on about 100 parts by weight of the multi-functional resin composite material. In some embodiments, the multi-functional resin composite material may include additive in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the additive can be in a range from about any of the foregoing amounts to about any other of the foregoing amounts.

When the additive is included in an amount within the above range, the composite material may exhibit the effect (property) of each additive.

The multi-functional resin composite material according to one embodiment may have a sheet resistance of less than or equal to about $10^2$ Ω/□.

The multi-functional resin composite material according to one embodiment may be may be prepared by any commonly known or conventional method of preparing a resin composition. For example, the constituting components according to one embodiment and optional additives can be mixed simultaneously, and melt-extruded in an extruder to be prepared in a form of a pellet. The multi-functional resin composite material may have a structure of including a thermoplastic resin as a matrix and fillers such as a nickel-coated carbon fiber, carbon nanotube, and an inorganic material dispersed inside (within) the matrix.

According to another embodiment, a molded product manufactured using the multi-functional resin composite material is provided. The multi-functional resin composite material may be formed into a molded product through various processes known in the art such as but not limited to injection molding, blow-molding, extrusion molding, thermal molding, and the like. In exemplary embodiments, the multi-functional resin composite material may be used to fabricate various electronic parts requiring excellent hardness, electrical conductivity, and EMI/RFI shielding property, for example, a display device such as TV, PDP, and the like, a computer, a mobile phone, an automatic office device, and various molded products such as interior frames and the like.

Hereinafter, the embodiments are illustrated in more detail with reference to examples. However, the following examples are exemplary embodiments and the present invention is not limited thereto.

EXAMPLES

A multi-functional resin composite material according to one embodiment includes each component as follows.

(A) Thermoplastic Resin

A polyphenylene sulfide resin having a melting index of 48 to 70 g/10 min at 316° C. and a load of 1270 g is used.

(B) Nickel-Coated Carbon Fiber

A nickel-coated carbon fiber fabricated by coating a 0.25 μm-thick nickel coating on a 4 mm-long carbon fiber having a diameter of 7 μm is used. As used herein, the nickel-coated carbon fiber has a volume resistance of $10^{-4}$ Ω·m and tensile strength of 238 GPa.

(B') Silver-Coated Glass Fiber

A glass fiber is fabricated by coating a 0.3 to 0.5 μm thick silver coating on a glass fiber with a diameter of 17 μm using an electroless plating method.

(C) Carbon Nanotube

A 1.5 μm-long multi-walled carbon nanotube having a diameter of 9.5 nm and purity of 90% is used.

(D) Inorganic Material (D-1) Permalloy, a nickel-iron alloy, is used and has a volume resistance of $10^{-7}$ Ω·m and relative permeability of 10,000.

(D-2) Silver powder made by Fukuda Metal Foil & Powder Co., Ltd. is used. The silver powder has a volume resistance of $10^{-10}$ Ω·m and relative permeability of less than or equal to 1.

(E) Glass Fiber

A 3 mm-long glass fiber with a diameter of 10 μm coated with a silane-based compatibilizer on the surface is used.

Examples 1 to 6 and Comparative Examples 1 to 5

The aforementioned components are used in the amounts set forth in the following Table 1 to prepare each multi-functional resin composite material according to Examples 1 to 6 and Comparative Examples 1 to 5.

The method of manufacturing the multi-functional resin composite materials includes mixing the components in the amounts set forth in the following Table 1 and preparing each specimen using a twin-screw extruder and an injection machine.

The properties of the specimens are measured using the following methods. The results are provided in the following Table 1.

(1) EMI shielding rate of a specimen is measured at a thickness of 2.1T in accordance with ASTM D4935

(2) Sheet resistance of a specimen is measured in accordance with ASTM D4496.

(3) Flexural strength of a ¼" thick specimen is measured in accordance with ASTM D790.

(4) IZOD Impact strength of a ⅛" thick specimen is measured in accordance with ASTM D256.

TABLE 1

|  | Examples | | | | | | Comparative Examples | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| (A) Thermoplastic resin (wt %) | 70 | 51.5 | 69 | 65 | 64 | 76 | 75 | 70.5 | 54.5 | 70 | 70 |
| (B) Nickel-coated carbon fiber (wt %) | 18.5 | 37 | 18.5 | 18.5 | 18.5 | 18.5 | 18.5 | 18.5 | — | — | 18.5 |
| (B') Silver-coated glass fiber (wt %) | — | — | — | — | — | — | — | — | — | 18.5 | — |
| (C) Carbon nanotube (wt %) | 0.5 | 0.5 | 1.5 | 0.5 | 0.5 | 0.5 | 0.5 | — | 0.5 | 0.5 | 0.5 |
| (D) Inorganic material | | | | | | | | | | | |
| (D-1, wt %) | 5.0 | 5.0 | 5.0 | 10.0 | 5.0 | 5 | — | 5 | 5 | 5.0 | — |
| (D-2, wt %) | — | — | — | — | — | — | — | — | — | — | 5 |
| (E) Glass fiber (wt %) | 6.0 | 6.0 | 6.0 | 6.0 | 12.0 | — | 6.0 | 6.0 | 40 | 6.0 | 6.0 |
| EMI shielding rate (dB) | 32 | 40 | 36 | 32 | 30 | 34 | 22 | 30 | 15 | 25 | 20 |
| Sheet resistance ($\Omega/\square$) | $5.6 \times 10^1$ | $2.9 \times 10^0$ | $2.1 \times 10^0$ | $1.3 \times 10^1$ | $4.1 \times 10^2$ | $5.3 \times 10^1$ | $7.4 \times 10^1$ | $9.2 \times 10^2$ | $9.0 \times 10^7$ | $8.5 \times 10^0$ | $7.0 \times 10^1$ |
| Flexural strength (GPa) | 17 | 19 | 16 | 17 | 16 | 15 | 15 | 16 | 11 | 19 | 17 |
| Impact strength (J/m) | 37 | 48 | 36 | 40 | 55 | 31 | 35 | 32 | 69 | 45 | 38 |

Referring to Table 1, the multi-functional resin composite materials including a thermoplastic resin, a nickel-coated carbon fiber, carbon nanotubes, and an inorganic material according to Examples 1 to 6 have excellent hardness, electrical conductivity, and EMI/RFI shielding property compared with Comparative Example 1 (no inorganic material), Comparative Example 2 (no carbon nanotubes), Comparative Example 3 (no nickel-coated carbon fiber), Comparative Example 4 (including a silver-coated glass fiber instead of a nickel-coated carbon fiber), and Comparative Example 5 (including an inorganic material having relative permeability outside of the range of the invention).

In particular, the multi-functional resin composite material of Comparative Example 1 with no inorganic material exhibits deteriorated EMI/RFI shielding properties. The multi-functional resin composite material of Comparative Example 2 with no carbon nanotubes exhibits deteriorated electrical conductivity. The multi-functional resin composite material of Comparative Example 3 with no nickel-coated carbon fiber exhibits deteriorated hardness, electrical conductivity, and EMI/RFI shielding properties. The multi-functional resin composite material of Comparative Example 4 including a silver-coated glass fiber instead of a nickel-coated carbon fiber and the multi-functional resin composite material of Comparative Example 5 including an inorganic material having a relative permeability outside of the range of the invention exhibit deteriorated EMI/RFI shielding properties.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A multi-functional resin composite material, comprising:
   (A) a thermoplastic resin;
   (B) a nickel-coated carbon fiber, wherein the nickel-coated carbon fiber (B) has a volume resistance of about $10^{-4}$ $\Omega \cdot m$ or less and a tensile strength of about 200 GPa or more;
   (C) a carbon nanotube; and
   (D) an inorganic material having a volume resistance of about $10^{-3}$ $\Omega \cdot m$ or less and a relative permeability of about 5000 or more.

2. The multi-functional resin composite material of claim 1, wherein the multi-functional resin composite material comprises about 40 to about 80 wt % of the thermoplastic resin (A), about 10 to about 40 wt % of the nickel-coated carbon fiber (B), about 0.1 to about 2 wt % of the carbon nanotube (C), and about 3 to about 20 wt % of the inorganic material (D).

3. The multi-functional resin composite material of claim 1, wherein the thermoplastic resin (A) comprises a polyamide resin, a polyester resin, a polyacetal resin, a polycarbonate resin, a polyimide resin, a polyphenyleneoxide resin, a polysulfone resin, a polyphenylene sulfide resin, a polyamide-imide resin, a polyethersulfone resin, a liquid crystal polymer, a polyetherketone resin, a polyetherimide resin, a polyolefin resin, a rubber modified vinyl-based copolymer resin, a polystyrene-based resin, or a combination thereof.

4. The multi-functional resin composite material of claim 1, wherein the thermoplastic resin (A) comprises a crystalline resin.

5. The multi-functional resin composite material of claim 1, wherein the nickel-coated carbon fiber (B) comprises a carbon fiber having a diameter of about 5 to about 12 μm and a length of about 3 to about 12 mm.

6. The multi-functional resin composite material of claim 1, wherein the nickel-coated carbon fiber (B) comprises a carbon fiber with a nickel coating having a thickness of about 0.01 to about 1 μm.

7. The multi-functional resin composite material of claim 1, wherein the carbon nanotubes (C) have a diameter of about 1 to about 50 nm and a length of about 10 nm to about 20 μm.

8. The multi-functional resin composite material of claim 1, wherein the inorganic material (D) comprises a nickel-iron alloy.

9. The multi-functional resin composite material of claim 1, wherein the inorganic material (D) comprises a Mu-metal, a Permalloy, or a combination thereof.

10. The multi-functional resin composite material of claim 1, wherein the multi-functional resin composite material further comprises (E) about 5 to about 20 parts by weight of a glass fiber based on about 100 parts by weight of the multi-functional resin composite material.

11. The multi-functional resin composite material of claim 10, wherein the glass fiber (E) has a diameter of about 8 to about 15 μm and a length of about 2 to about 12 mm.

12. The multi-functional resin composite material of claim 1, wherein the multi-functional resin composite material further comprises an additive agent including an antibacterial agent, a heat stabilizer, an antioxidant, a release agent, a light stabilizer, a surfactant, a coupling agent, a plasticizer, an admixture, a stabilizer, a lubricant, an antistatic agent, a tinting agent, a flame proofing agent, a weather-resistance agent, a colorant, a ultraviolet (UV) absorber, a ultraviolet (UV) blocking agent, a nucleating agent, an adhesion aid, an adhesive, or a combination thereof.

13. A molded product formed of the multi-functional resin composite material according to claim 1.

* * * * *